(12) United States Patent
Scian

(10) Patent No.: US 8,553,877 B2
(45) Date of Patent: Oct. 8, 2013

(54) SUBSTITUTION TABLE MASKING FOR CRYPTOGRAPHIC PROCESSES

(75) Inventor: Anthony Fabian Scian, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 1457 days.

(21) Appl. No.: 12/125,405

(22) Filed: May 22, 2008

(65) Prior Publication Data

US 2009/0086976 A1    Apr. 2, 2009

Related U.S. Application Data

(60) Provisional application No. 60/976,705, filed on Oct. 1, 2007.

(51) Int. Cl.
*H04L 9/28*    (2006.01)

(52) U.S. Cl.
USPC ............... 380/28; 380/37; 380/205; 380/252; 380/255; 380/263; 380/264; 380/277; 713/171

(58) Field of Classification Search
USPC ............. 380/28, 37, 205, 252, 255, 263, 264, 380/277; 713/171
See application file for complete search history.

(56) References Cited

U.S. PATENT DOCUMENTS

| | | | |
|---|---|---|---|
| 5,003,596 A * | 3/1991 | Wood | 380/28 |
| 5,398,284 A | 3/1995 | Koopman, Jr. et al. | |
| 5,623,548 A | 4/1997 | Akiyama et al. | |
| 6,182,216 B1 | 1/2001 | Luyster | |
| 6,246,768 B1 | 6/2001 | Kim | |
| 6,269,163 B1 | 7/2001 | Rivest et al. | |
| 6,295,606 B1 | 9/2001 | Messerges et al. | |
| 6,578,061 B1 | 6/2003 | Aoki et al. | |
| 6,751,319 B2 | 6/2004 | Luyster | |
| 6,940,975 B1 | 9/2005 | Kawamura et al. | |
| 7,236,592 B2 | 6/2007 | Coppersmith et al. | |
| 7,536,014 B2 * | 5/2009 | Kim et al. | 380/268 |
| 2003/0048903 A1 | 3/2003 | Ito et al. | |
| 2004/0131182 A1 | 7/2004 | Rogaway | |

(Continued)

FOREIGN PATENT DOCUMENTS

| | | |
|---|---|---|
| EP | 1267514 A2 | 12/2002 |
| EP | 1722502 A1 | 11/2006 |
| WO | 2007102898 A2 | 9/2007 |

OTHER PUBLICATIONS

International Preliminary Report on Patentability dated Apr. 15, 2010 in PCT/CA2008/000972.

(Continued)

*Primary Examiner* — Thanhnga B Truong
(74) *Attorney, Agent, or Firm* — Etienne de Villiers; Dimock Stratton LLP

(57) ABSTRACT

A computing device-implemented method and system is provided for obtaining an interim masked substitution table value for a given input component in a cryptographic round, such as an AES cryptographic round, using a substitution table and a self-cancelling mask. A mask with a length equal to an entry in the substitution table is provided, wherein the mask comprises a plurality of mask components of equal length such that a bitwise logical inequality operation such as XOR on the mask components equals zero, and the substitution table is masked with this mask. For each of input component, an interim masked substitution table value is obtained from the substitution table thus masked.

24 Claims, 6 Drawing Sheets

(56) References Cited

U.S. PATENT DOCUMENTS

| | | |
|---|---|---|
| 2004/0190712 A1 | 9/2004 | Rose |
| 2004/0202317 A1 | 10/2004 | Demjanenko et al. |
| 2005/0084097 A1 | 4/2005 | Ho et al. |
| 2005/0259814 A1 | 11/2005 | Gebotys |
| 2006/0008079 A1 | 1/2006 | Daemen et al. |
| 2006/0023873 A1 | 2/2006 | Joye |
| 2006/0056622 A1 | 3/2006 | Liardet et al. |
| 2006/0072743 A1 | 4/2006 | Naslund et al. |
| 2006/0159257 A1 | 7/2006 | Fischer |
| 2006/0256963 A1 | 11/2006 | Gebotys |
| 2007/0053509 A1 | 3/2007 | Pezeshki et al. |
| 2007/0058800 A1 | 3/2007 | Neisse et al. |
| 2007/0071234 A1 | 3/2007 | Lagrange et al. |
| 2007/0071235 A1 | 3/2007 | Fujisaki et al. |
| 2007/0110224 A1 | 5/2007 | Gumpel et al. |
| 2007/0140478 A1 | 6/2007 | Komano et al. |
| 2007/0177720 A1 | 8/2007 | Bevan et al. |
| 2007/0195949 A1 | 8/2007 | Okochi et al. |
| 2007/0206785 A1 | 9/2007 | Romain |
| 2007/0211890 A1 | 9/2007 | Gebotys |
| 2007/0286413 A1 | 12/2007 | Derouet |
| 2008/0019503 A1* | 1/2008 | Dupaquis et al. ............... 380/28 |

OTHER PUBLICATIONS

Gladman, Brian, Dr.: "A Specification for Rijndael, the AES Algorithm", v3.11, pp. 1-37, Sep. 12, 2003.
Chang, Hwasun and Kim, Kwangjo: "Securing AES against Second-Order DPA by Simple Fixed-Value Masking", International Research Center for Information Security, Information and Communications Univ., 6 pages.
Kocher, Paul; Jaffe, Joshua; and Jun, Benjamin: "Differential Power Analysis", Cryptography Research, Inc., pp. 1-10.
Federal Information Processing Standards Publication 197: Advanced Encryption Standard (AES), pp. 1-47, Nov. 26, 2001.
Daemen, Joan and Rijmen, Vincent: "AES Proposal: Rijndael", Document version 2, pp. 1-45, Sep. 3, 1999.
Akkar, M.-L., Bévan, R., and Goubin, L. "Two Power Analysis Attacks against One-Mask Methods". In Bimal K. Roy and Willi Meier, editors, Fast Software Encryption—FSE 2004, vol. 3017 of Lecture Notes in Computer Science (LNCS), pp. 332-347, Springer-Verlag, 2004.
Bertoni, G. and Breveglieri, L. Efficient Software Implementation of AES on 32-bit Platforms. Proceedings of the Workshop on Cryptographic Hardware and Embedded Systems 2002 (CHES 2002), Aug. 13-15, 2002, Redwood City, USA., pp. 1-25.
Blömer, J., Guajardo, J., and Krummel, V. "Provably Secure Masking of AES". Lecture Notes in Computer Science, Springer-Verlag, 2005, vol. 3357/2005, Selected Areas in Cryptography, pp. 69-83.
Chang, H. and Kim, K. "Securing AES against Second-Order DPA by Simple Fixed-Value Masking". Joho Shori Gakkai Shinpojiumu Ronbunshu Journal, vol. 2003, No. 15, pp. 145-150, 2003.
Chang, H. "A Study on Securing AES against Differential Power Analysis". Thesis for Degree of Master, School of Engineering, Information and Communications University, 2004, pp. 1-63. Advisor: Professor Kim, K.
Courtois, N. T. and Goubin, L. "An Algebraic Masking Method to Protect AES Against Power Attacks". 8th Annual International Conference on Information Security and Cryptology, Dec. 1-2, 2005, Seoul, Korea, pp. 1-18.
Coron, J.-S. and Goubin, L. "On Boolean and Arithmetic Masking against Differential Power Analysis". In Ç. .K. Ko↑ and C. Paar, editors, Cryptographic Hardware and Embedded Systems—CHES 2000, vol. 1965 of Lecture Notes in Computer Science, pp. 231-237, Springer-Verlag, 2000.
Vaarala, S. "Symmetric Algorithms". Telecommunications Software and Multimedia Laboratory, Finland, course T-110.5210 Cryptosystems, Oct. 3, 2007, pp. 1-13.
ECRYPT, European Network of Excellence in Cryptology. "D.Vam.6 Open Problems in Implementation and Application". Information Society Technologies—IST-2002-507932, Mar. 13, 2006, pp. 1-28.

FIPS publication 197. "Advanced Encryption Standard (AES)". Nov. 26, 2001, pp. 1-51.
Fournier, J. and Tunstall, M. "Cache Based Power Analysis Attacks on AES". In L. M. Batten and R. Safavi-Naini, editors, Australasian Conference on Information Security and Privacy—ACISP 2006, vol. 4058 of Lecture Notes in Computer Science, pp. 17-28, Springer-Verlag, 2006.
Gladman, B. "A Specification for Rijndael, the AES Algorithm". A Specification for the AES Algorithm, vol. 3.11, Sep. 12, 2003, pp. 1-37.
Golić, J. D. and Tymen, C. "Multiplicative Masking and Power Analysis of AES". B. S. Kalkiski, Jr. et al., editors: Revised papers from the 4th International Workshop on Cryptographic Hardward and Embedded Systems—CHES 2002, Lecture Notes in Computer Science, vol. 2523, pp. 198-212, Springer-Verlag, 2003.
Golić, J. D. and Tymen, C. "Multiplicative Masking and Power Analysis of AES". CHES 2002, Aug. 13-15, 2002, Redwood City, USA., pp. 1-21.
Goubin, L. and Patarin, J. "DES and Differential Power Analysis—The 'Duplication' Method". CHES 1999, Springer-Verlag, 1999, pp. 158-172.
Huang, A. "Keeping Secrets in Hardware". CHES 2002, Aug. 13-15, 2002, pp. 1-50.
Itoh, K., Takenaka, M., and Torii, N. "DPA Countermeasure Based on the "Masking Method"". K. Kim, editor, ICICS 2001, Lecture Notes in Computer Science 2288, pp. 440-456, Springer-Verlag 2002.
Kocher, P., Jaffe, J., and Jun, B. "Differential Power Analysis" . Proceedings of the 19th Annual International Cryptology Conference on Advances in Cryptology, Lecture Notes in Computer Science; vol. 1666, pp. 388-397, Springer-Verlag, 1999.
Mangard, S. and Schramm, K. "Pinpointing the Side-Channel Leakage of Masked AES Hardware Implementations". In Louis Goubin and Mitsuru Matsui, editors, CHES 2006, vol. 4249 of Lecture Notes in Computer Science, pp. 76-90, Springer-Verlag, 2006.
Mangard, S., Pramstaller, N., and Oswald, E. "Successfully Attacking Masked AES Hardware Implementations". CHES 2005, Aug. 29-Sep. 1, 2005, Edinburgh, Scotland, Lecture Notes in Computer Science (LNCS), Springer-Verlag, 2005.
Molnar, D. et al. "The Program Counter Security Model: Automatic Detection and Removal of Control-Flow Side Channel Attacks". Information Security and Cryptology (ICISC 2005), Lecture Notes in Computer Science, vol. 3935/2006, pp. 156-168, Springer-Verlag, 2006.
Osvik, D. A., Shamir, A., and Tromer, E. "Cache Attacks and Countermeasures: the Case of AES". Extended version, revised Nov. 20, 2005, pp. 1-25, Topics in Cryptology—CT-RSA 2006, The Cryptographers' Track at the RSA Conference 2006, Lecture Notes in Computer Science vol. 3860/2006, Springer-Verlag, 2006.
Oswald, E. and Schramm, K. "An Efficient Masking Scheme for AES Software Implementations". Information Security Applications, 6th International Workshop (WISA 2005), Jeju Island, Korea, Aug. 22-24, 2005, Revised Selected Papers, Lecture Notes in Computer Science, vol. 3786-2006, pp. 292-305, Springer-Verlag 2006.
Daemen, J. and Rijmen, V. "AES Proposal: Rijndael". The Rijndael Block Cipher, document version 2, Sep. 3, 1999, pp. 1-45.
Morioka, S. and Satoh, A. "An Optimized S-Box Circuit Architecture for Low Power AES Design". Revised papers from the 4th International Workshop on Cryptographic Hardware and Embedded Systems (CHES) 2002, Aug. 13-15, 2002, Redwood City, USA pp. 1-24, Lecture Notes in Computer Science, vol. 2523, pp. 172-186, Springer-Verlag, 2002.
Thiagarajan, E. and Gourishetty, M. "Study of AES and its Efficient Software Implementation". Department of Electrical Engineering & Computer Science, Oregon State University, 2003, pp. 1-4.
Tillich, S. and Grosschädl, J. "Power Analysis Resistant AES Implementation with Instructions Set Extensions". Workshop on Cryptographic Hardware and Embedded Systems (CHES) 2007, Vienna, Austria, Sep. 10-13, 2007, pp. 1-30.
Trichina, E., De Seta, D., and Germani, L. "Simplified Adaptive Multiplicative Masking for AES". B. S. Kaliski Jr. et al, editors, Workshop on Cryptographic Hardware and Embedded Systems (CHES) 2002, Lecture Notes in Computer Science, vol. 2523, pp. 187-197, Springer-Verlag, 2003.

(56) References Cited

OTHER PUBLICATIONS

Trichina, E. and Korkishko, T. "Secure AES Hardware Module for Resource Constrained Devices". C. Castelluccia et al., editors, ESAS 2004, Lecture Notes in Computer Science, vol. 3313, pp. 216-230, Springer-Verlag, 2005.

Supplementary Search Report dated Dec. 19, 2011 from EP08748336.8.

Gebotys C: 'Differential Analysis of a 1-16 Low Energy Table-Based Countermeasure for Secure Embedded Systems', Internet Citation, 2005, XP002455441, Retrieved from the Internet: URL:University Waterloo Canada [retrieved on Oct. 18, 2007].

Itoh K et al: 'DPA countermeasure based on the masking method', Lecture Notes in Computer Science/MICCAI 2000, Springer, DE, vol. 2288, Dec. 1, 2001, pp. 440-456, XP002322028, ISBN: 978-3-540-24128-7.

* cited by examiner

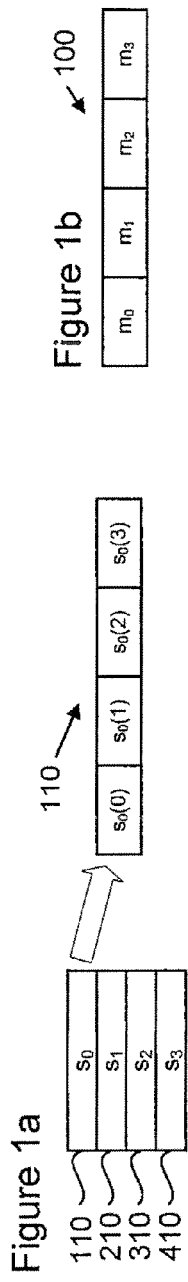

SUBSTITUTION TABLE MASKING FOR CRYPTOGRAPHIC PROCESSES

TECHNICAL BACKGROUND

1. Technical Field

This invention relates generally to computing systems implementing encryption and decryption operations and, more particularly, to masking substitution table values in cryptographic operations.

2. Description of the Related Art

Computing systems often require operations to be carried out in a secure manner. For embedded computing devices and for pervasive systems, security of operation is often desired. To ensure that operations and communications are secure, such systems employ cryptographic methods to encrypt and decrypt data.

However, cryptographic methods are subject to attacks. One type of non-invasive attack on computing devices implementing cryptographic methods is known as a power analysis attack. A power analysis attack involves the monitoring of the power consumption of one or more components of a device while the device executes a cryptographic method. The data derived from monitoring power consumption of the device, combined with knowledge of the operations being carried out by the device, are used to derive the secret information that is part of the cryptographic method. For example, a differential power analysis (DPA) attack may target the input or the output of Substitution tables (also referred to as substitution boxes or "S-boxes") that are common in cryptographic algorithms and are often implemented as lookup tables. The input to an S-box may include key bits and plaintext, or information derived from plaintext. In carrying out an attack to determine a key value used in a cryptographic system, an attacker controls the plaintext values and makes guesses at the key bits. Based on these guesses, computations are performed on the acquired power traces to form a set of DPA data. The DPA data with the largest peak value is used to determine which of the key bit guesses was likely correct. As will be appreciated by those skilled in the art, another type of attack is based on electromagnetic analysis of the device carrying out a cryptographic process. Although the description below references power attacks, it will be appreciated that electromagnetic analysis attacks may raise the same issues.

BRIEF DESCRIPTION OF THE DRAWINGS

In drawings which illustrate by way of example only an exemplary embodiment of the invention, FIG. 1a is a schematic representation of a state in accordance with the exemplary embodiment.

FIG. 1b is a schematic representation of a mask in accordance with the exemplary embodiment.

FIG. 2a is a schematic representation of a substitution table in accordance with the exemplary embodiment.

FIG. 2b is a schematic representation of a masked substitution table in accordance with the exemplary embodiment, FIG. 3a is a schematic representation of a further substitution table in accordance with the exemplary embodiment.

FIG. 3b is a schematic representation of a further masked substitution table in accordance with the exemplary embodiment.

DETAILED DESCRIPTION

Figure 4A:
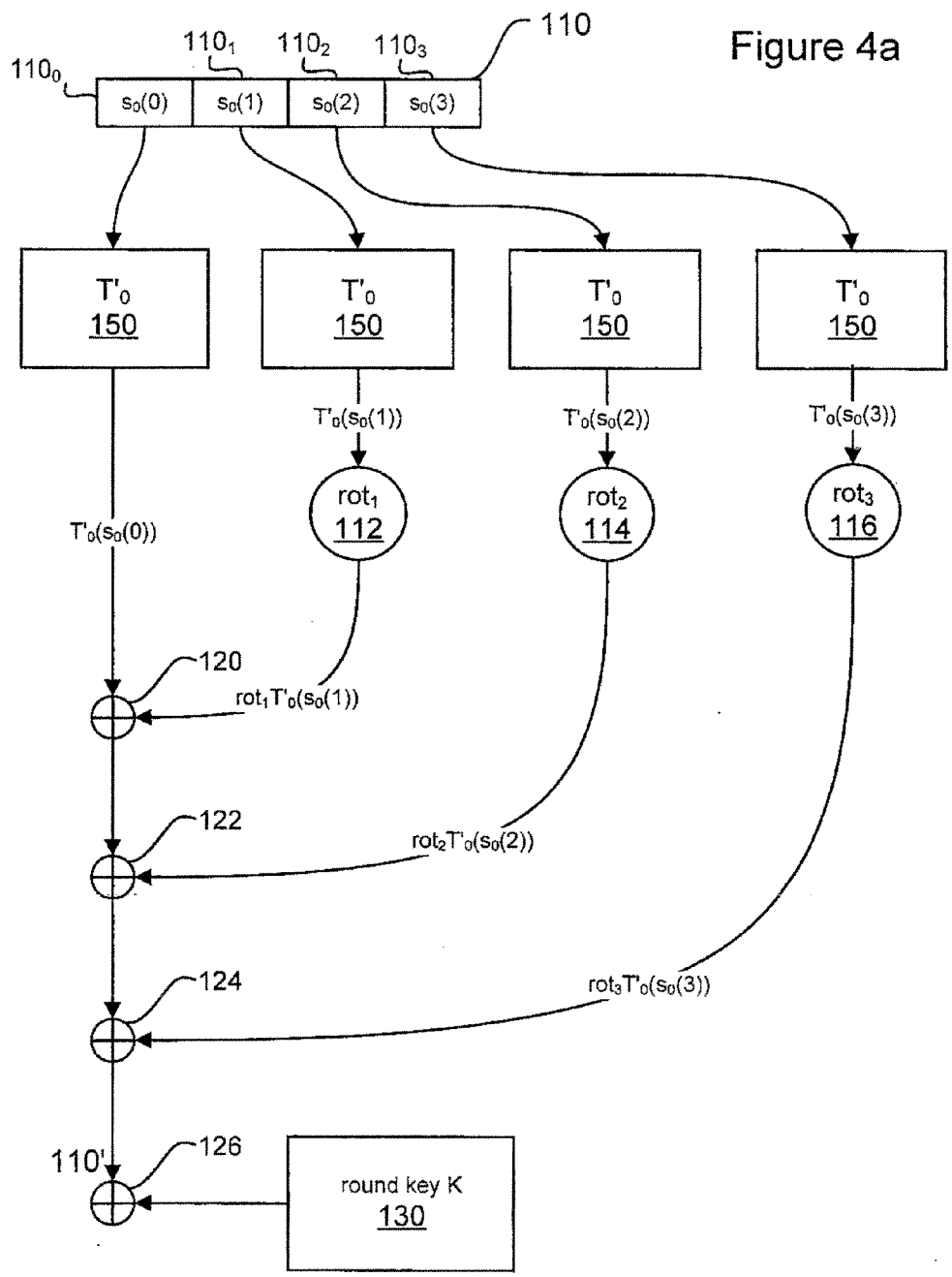
FIG. 4a is a schematic representation of a portion of a cryptographic round using a masked substitution table in accordance with the exemplary embodiment.

While countermeasures have been devised to guard cryptographic methods against DPA and other such attacks, such countermeasures may be costly in terms of system power consumption, memory requirements, or speed of processing. There is a need for an efficient substitution table-masking countermeasure that offers resistance to DPA attacks on the outputs from the substitution tables. There is a further need for an efficient substitution table-masking countermeasure with limited memory usage and access requirements.

The systems and methods of the various embodiments disclosed herein may be implemented as a computer program product that includes program code that operates to carry out the steps in the process described below. The methods may be implemented as one or more computer systems (which includes a subsystem or system defined to work in conjunction with other systems) for encryption or decryption that includes elements that execute the functions as described.

The systems may be defined by, and the computer program product may be embodied in, signals carried by networks, including the Internet or may be embodied in media such as magnetic, electronic or optical storage media. The processes described may be implemented on computing devices as methods to be carried out by a combination of computing code and hardware embodied in the computing devices (the process being in this case a computing device-implemented method). Computing devices on which the methods are able to be implemented include full-featured computers, mobile devices such as wireless mobile devices, and other devices incorporating computing system technology. The methods are particularly applicable to devices where memory storage is limited and power consumption is an important consideration in device operation.

In different cryptographic operations implemented in computing devices, substitution tables are used. Examples of cryptographic systems implementing such substitution tables include the Advanced Encryption Standard (AES) (Federal Information Processing Standards Publication 197), as published by the National Institute of Standards and Technology on Nov. 26, 2001 ("FIPS 197"); Daemen and Vincent Rijmen, The Rijndael Block Cipher, version 2, 1999; and Gladman, A Specification for Rijndael, the AES Algorithm, version 3.11, Sep. 12, 2003 ("Gladman"), all of which are incorporated by reference. For ease of reference, the embodiments below are described in an AES implementation, but it is in no way intended as a limitation to the scope of the following embodiments. It will be appreciated by those of ordinary skill in the art that AES is not the only cipher implementing substitution tables, and that the following embodiments may be implemented accordingly as countermeasures against attacks against other cryptographic systems implementing substitution tables.

In certain ciphers, such as AES, encryption or decryption may take place in the course of one or more rounds. Each of these rounds may comprise a substitution transformation, wherein at least a portion of the input to the round (which may be each byte, each word, each subword, or other component of the input) is substituted with data of equivalent size. The implementation of substitution tables and AES in computing devices will be readily understood by those of ordinary skill in the art. Because this transformation includes a lookup to a substitution table, a potential vulnerability in the AES cipher is a side channel attack, such as a DPA attack, on the output from the substitution table itself.

Thus, to guard against DPA or other side channel attacks, the intermediate outputs from substitution boxes may be masked by applying masks to the substitution boxes to generate masked substitution boxes, which are utilized in place of the original substitution tables. Because the substitution table output is obfuscated through the application of masks to the substitution tables, this prior art solution requires the generation and storage of a separate mask table, or retention of the mask so that the obfuscating effect of the mask can be reversed at a later stage in the cryptographic process, with adverse effects on either computational cost or memory requirements in the device implementing the cryptographic process.

The exemplary embodiment is described in the context of an implementation of the AES cipher on a computing device. As described in the cited literature, AES specifies a particular size of cipher key (for example, 128, 192, or 256 bits), and a fixed block size of 128 bits. The state, which is 128 bits in size, may be represented by a set of four 32-bit words, as shown in FIG. 1a. These four 32-bit words 110, 210, 310, and 410 are denoted $s_0$, $s_1$, $s_2$, and $s_3$. Each of these 32-bit words consists of four bytes. In FIG. 1a, a representation of the first word, $s_0$, is shown, comprising $s_0(0)$, $s_0(1)$, $s_0(2)$, and $s_0(3)$.

In the AES cipher, the input is copied into the internal state. The input, as noted above, may be an initial plaintext input, or an intermediate input generated as the result of a previous round in cryptographic process. An initial round key, not shown in the figures, is then added and the state is transformed through a number of iterations of a round function; the number of iterations may vary according to the length of the AES key and other parameters. Once round functions are complete, the final state is copied to the AES cipher output.

The intermediate round functions of the AES cipher may be described in pseudocode as follows:

```
Round(State,RoundKey)
{
ByteSub(State);
ShiftRow(State);
MixColumn(State);
AddRoundKey(State,RoundKey);
}
``` where each round is effected on the current state (i.e., input) and on a key designated for that round (RoundKey), and the transformations comprise a substitution of each byte of the state using a predetermined substitution table (ByteSub (State)), a shifting of rows within the state (ShiftRow(State)), a mixing of columns within the state (MixColumn(State)), and finally the addition of a round key by an XOR operation (AddRoundKey (State, RoundKey)). It will be appreciated by those skilled in the art that not every round in the AES necessarily comprises each of these functions; in the initial round, a round key is added by an XOR operation, but other transformations are not executed; in the final round, the Mix-Column(State) function is not carried out. The definitions of these various functions of the cryptographic rounds are set out in FIPS 197, and will be understood by the skilled worker.

Certain efficiencies in memory consumption or processing time may be realized in implementation, in particular when the AES cipher is implemented on a system comprising a 32-bit processor, particularly if the processor includes operations that can cyclically rotate the bytes within such words. The intermediate rounds of the AES cipher may be implemented using multiple entry-wise rotations of a single substitution table that provide the byte substitution, row shifting, and column mixing functions. Each such rotation of the substitution table is obtained from an initial table by rotating each element of the initial table. In the exemplary embodiment, a total of four such rotations are used. This implementation is described in Gladman.

In general-purpose applications, security requirements may be moderate, but calculation efficiency and memory efficiency are subject to restrictions. In such circumstances it would be useful to provide an efficient substitution table masking countermeasure that offers some resistance to DPA attacks on the outputs to the substitution tables but with minimal increase to the computational cost of the encryption or decryption method. In particular, it would be useful to provide an efficient substitution table masking countermeasure that offers some resistance to first order DPA attacks.

Accordingly, in the exemplary embodiment, a cryptographic process with masking is provided, and is described in the context of the Gladman implementation. The substitution table used in the exemplary embodiment, $T_0$, is a set of 256 32-bit words, as shown in FIG. 2a. The exemplary substitution table shown in FIG. 2a contains elements $T_0(0)$, $T_0(1)$, ... $T_0(255)$, where each $T_0(n)$ represents a 32-bit word found at index n. This table is stored in memory on the computing device.

A mask 100 is provided, which will be described in detail below. Prior to the initiation of the AES cryptographic round, each element of the substitution table $T_0$ is masked with the mask 100, for example by adding the mask 100 value to each element of the substitution table $T_0(n)$ through a bitwise inequality operation such as XOR. The substitution table thus masked, $T'_0$, is stored in memory, and the original substitution table $T_0$ may be overwritten by the newly masked substitution table $T'_0$. A representation of a masked substitution table $T'_0$ 150 is shown in FIG. 2b.

In an intermediate cryptographic round in the AES cipher, the masked substitution table $T'_0$ is accessed a number of times. Turning to FIG. 4a, a portion of an intermediate cryptographic round is shown. For a given component in the state or input 110, each subword or byte of the component is used to access one of the 256 elements of the masked substitution table 150. For example, the byte value, which is in the range 0-255, is used to index into the masked substitution table 150 to obtain a 32-bit word as an interim masked substitution table output. In FIG. 4a, it can be seen that the result of the highest-order input byte $110_0$ to the masked substitution table 150 is $T'_0((s_0(0))$, as the value of the input byte $110_0$, $s_0(0)$, is used to index the masked substitution table 150. The next-highest-order byte of the input component 110, $110_1$, is also used to index the masked substitution table 150 to retrieve the 32-bit value $T'_0((s_0(1))$. However, in accordance with this implementation of the AES cipher, the resultant word $T'_0((s_0(1))$ is subjected to a rotation operation 112, $rot_1$, such that the bytes in positions 0, 1 and 2 in the word are moved to positions 1, 2 and 3 respectively, and the byte in position 3 is moved to position 0. Thus, if the value of $T'_0((s_0(1))$ were the word abcd where each of a, b, c, and d are each one byte of the word, $rot_1(abcd)$ will yield:

bcda

The first result from the masked substitution table, $T'_0((s_0(0))$, is combined with the result of the rotation operation 112, for example in bitwise inequality operation 120 such as XOR.

The second-lowest-order byte of the input component 110, $110_2$, is used to index the masked substitution table 150 to retrieve the 32-bit value $T'_0((s_0(2))$. This result is then rotated in a rotation operation 114, or $rot_2$, such that the bytes in positions 0, 1, 2 and 3 are moved to positions 2, 3, 0, and 1 respectively; thus, $rot_2(abcd)$=cdab. The result of rotation operation 114 is then combined with the result of the operation 120 in a bitwise inequality operation 122, such as an XOR operation.

The lowest-order byte of the input component 110, $110_3$, is used to index the masked substitution table 150 to retrieve the 32-bit value $T'_0((s_0(3))$. This result is then rotated in a rotation operation 116, or $rot_3$, such that the bytes in positions 1, 2 and 3 are moved to positions 0, 1 and 2 respectively, and the byte in position 0 is moved to position 3; thus, $rot_3(abcd)$=dabc. The result of rotation operation 116 is then combined with the result of the operation 122 in a bitwise inequality operation 124, such as an XOR operation. The output of the operation 124 is the substitution table output, denoted as 110', may then be combined with a round key 130 in a bitwise inequality operation 126 in accordance with the cipher requirements. As no rotation was applied to the masked substitution table 150 value $T'_0((s_0(0))$ from the input of the highest byte $110_0$, the rotation for this first iteration may be considered to be a null rotation (i.e., $rot_0(abcd)$=abcd).

Figure 4B:
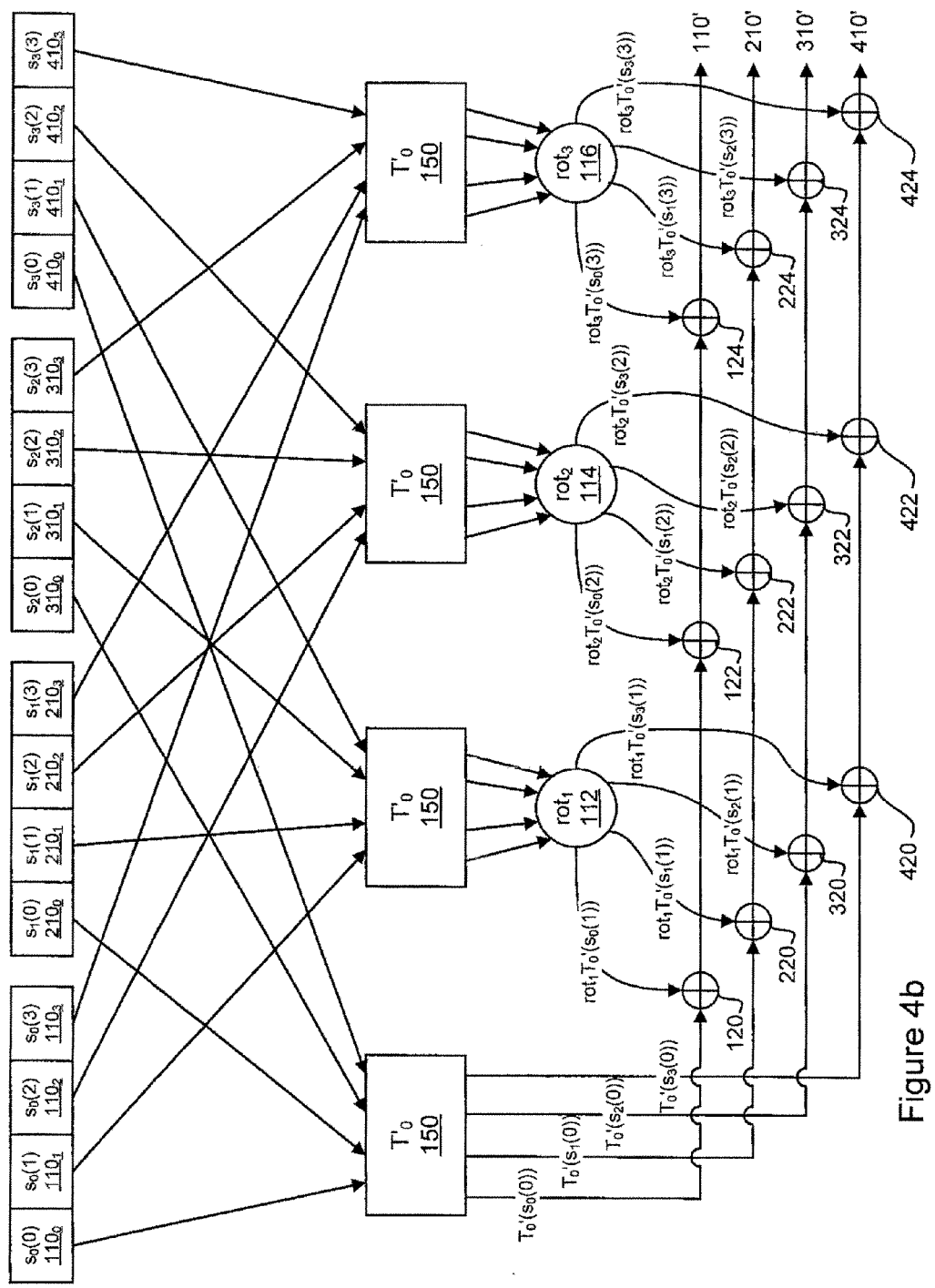
FIG. 4b is a schematic representation of a further portion of a cryptographic round using a masked substitution table in accordance with the exemplary embodiment.

As the state in the AES implementation comprises three further input components, each of these three further components are similarly processed. Turning to FIG. 4b, the portion of the cryptographic round depicted in FIG. 4a is replicated for all four components with the exception of the operation 126 and the round key 130; it can be seen, for example, that the bytes of the second component of the input state 210 ($210_0$, $210_1$, $210_2$, $210_3$) are each used to index the masked substitution table 150, and the resultant interim output is rotated by none, $rot_1$ 112, $rot_2$ 114, and $rot_3$ 116 respectively. These outputs, thus rotated, are then combined in bitwise logical operations 220, 222, and 224 in a manner similar to that described with respect to FIG. 4a to provide a substitution table output 210'.

Similarly, the bytes of the third component of the input state 310 ($310_0$, $310_1$, $310_2$, $310_3$) are each used to index the masked substitution table 150, and the resultant interim output is rotated by none, $rot_1$ 112, $rot_2$ 114, and $rot_3$ 116 respectively. These outputs, thus rotated, are then combined in bitwise logical operations 320, 322, and 324 in a manner similar to that described with respect to FIG. 4a to provide a substitution table output 310'.

Finally, the bytes of the fourth component of the input state 410 ($410_0$, $410_1$, $410_2$, $410_3$) are each used to index the masked substitution table 150, and the resultant interim output is rotated by none, $rot_1$ 112, $rot_2$ 114, and $rot_3$ 116 respectively. These outputs, thus rotated, are then combined in bitwise logical operations 420, 422, and 424 in a manner similar to that described with respect to FIG. 4a to provide a substitution table output 410'.

The mask 100 may be generated as needed or at predetermined intervals, and may be derived from a random or pseudo-random value in such a manner that an attacker cannot reliably predict its value. The mask 100 has the same length as an entry in the substitution table $T_0$; thus, in the exemplary embodiment implementing AES, the mask 100 is 32 bits long. As represented in FIG. 1b, the mask 100 may be represented by $m_0m_1m_2m_3$ and consists of four components, such as the one-byte subwords illustrated in FIG. 1b, $m_0$, $m_1$, $m_2$, and $m_3$. It can be seen that the total number of subwords in the mask 100 is equal to the number of substitution table versions applied to a given component of input 110 within a single cryptographic round, as described above, and each of the subwords of the mask 100 are of equal length. The mask 100 is defined such that the combination of each of the subwords in a logical bitwise inequality operation yields zero, i.e., a string in which all bits are zero. Thus, if the operation is XOR, $$m_0 \oplus m_1 \oplus m_2 \oplus m_3 = 0.$$

It will be appreciated by those skilled in the art that the mask 100 may be generated by randomly or pseudo-randomly generating three of the mask components selected from $m_0, m_1, m_2,$ and $m_3$, and determining the remaining mask component such that $m_0 \oplus m_1 \oplus m_2 \oplus m_3 = 0$, if the operation performed is NOR. It will further be appreciated that the mask 100 possesses the property that $$m_0m_1m_2m_3 \oplus rot_1(m_0m_1m_2m_3) \oplus rot_2(m_0m_1m_2m_3) \oplus rot_3(m_0m_1m_2m_3) =$$
$$m_0m_1m_2m_3 \oplus m_1m_2m_3m_0 \oplus m_2m_3m_0m_1 \oplus m_3m_0m_1m_2 = 0$$

where the inequality operation is applied bitwise. In the exemplary embodiment, a left shift is used; however, a right shift may also be employed. Further, while the rotations defined herein are presented sequentially (i.e., successive rotations of 8, 16, and 24 bits), they need not be applied sequentially, provided each of the rotations is applied exactly once. It will also be appreciated by those skilled in the art that the mask components need not comprise subwords of a given word; rather, the mask components may be disconnected or unrelated provided the logical bitwise inequality operation on the mask components yields zero. Further, it will also be appreciated that while the rotations described above, in the context of the Gladman implementation of AES, comprise a cyclic group of rotations, other embodiments may use non-cyclic permutations of the mask components or of the input components to achieve the same result.

Given the foregoing property of the mask 100, it can be seen that for a given word input in the cryptographic round, for example, word 210, the substitution table output 210' will be $$T'_0(s_1(0)) \oplus rot_1(T'_0(s_1(1))) \oplus rot_2(T'_0(s_1(2))) \oplus rot_3(T'_0(s_1(3))) =$$
$$m_0m_1m_2m_3 \oplus T_0(s_1(0)) \oplus rot_1(m_0m_1m_2m_3 \oplus T_0(s_1(1))) \oplus$$
$$rot_2(m_0m_1m_2m_3 \oplus T_0(s_1(2))) \oplus rot_3(m_0m_1m_2m_3 \oplus T_0(s_1(3))) =$$
$$m_0m_1m_2m_3 \oplus T_0(s_1(0)) \oplus rot_1(m_0m_1m_2m_3) \oplus$$
$$rot_1(T_0(s_1(1))) \oplus rot_2(m_0m_1m_2m_3) \oplus$$
$$rot_2(T_0(s_1(2))) \oplus rot_3(m_0m_1m_2m_3) \oplus rot_3(T_0(s_1(3))) =$$
$$m_0m_1m_2m_3 \oplus T_0(s_1(0)) \oplus m_1m_2m_3m_0 \oplus rot_1(T_0(s_1(1))) \oplus$$

-continued $$m_2m_3m_0m_1 \oplus rot_2(T_0(s_1(2))) \oplus m_3m_0m_1m_2 \oplus rot_3(T_0(s_1(3))) =$$

$$m_0m_1m_2m_3 \oplus m_1m_2m_3m_0 \oplus m_2m_3m_0m_1 \oplus m_3m_0m_1m_2 \oplus T_0(s_1(0)) \oplus$$

$$rot_1(T_0(s_1(1))) \oplus rot_2(T_0(s_1(2))) \oplus rot_3(T_0(s_1(3))) = 0 \oplus$$

$$T_0(s_1(0)) \oplus rot_1(T_0(s_1(1))) \oplus rot_2(T_0(s_1(2))) \oplus rot_3(T_0(s_1(3))) =$$

$$T_0(s_1(0)) \oplus rot_1(T_0(s_1(1))) \oplus rot_2(T_0(s_1(2))) \oplus rot_3(T_0(s_1(3)))$$

The substitution table output 210' is thus the XOR of the results of a table lookup performed on an unmasked rotation of the substitution table $T_0$. Thus, while each of the individual output values from the table lookup during the cryptographic round was masked, the mask self-cancels once the substitution table output is obtained. After the intermediate outputs resulting from the inputs $110_0$, $110_1$, $110_2$, and $110_3$ are operated on, the obfuscating effect of the mask 100 is eliminated without the need to retain the mask 100 after the cryptographic substitution table lookups are complete. This embodiment thus provides a measure of protection against a side channel attack directed to the output of the substitution table.

It is also possible to implement the AES cipher with an n-table lookup round, where n entry-wise rotations of the substitution table $T_0$ are stored in memory on the device, rather than a single table. For ease of illustration, this embodiment is described with n=4. This avoids the need to use a rotation operation on the output from the masked substitution table 150, thus saving an operation in each round at the expense of memory in a computing device. Each of the substitution tables needed, $T_i$, where i=0 . . . n−1, are generated and stored, for example by applying an ith rotation to the substitution table $T_0$. The substitution tables $T_i$ may be arrays of 256 32-bit words, as shown in FIG. 3a. The mask 100 is applied to each substitution table $T_0$ provide $T_0$ as described above; however, prior to masking each of the subsequent substitution tables $T_1$, $T_2$, and $T_3$, a corresponding rotation operation is performed. Thus:

$$T'_0 = m_0m_1m_2m_3 \oplus T_0$$

$$T'_1 = rot_1(m_0m_1m_2m_3) \oplus T_1$$

$$T'_2 = rot_2(m_0m_1m_2m_3) \oplus T_2$$

$$T'_3 = rot_3(m_0m_1m_2m_3) \oplus T_3$$

Figure 5:
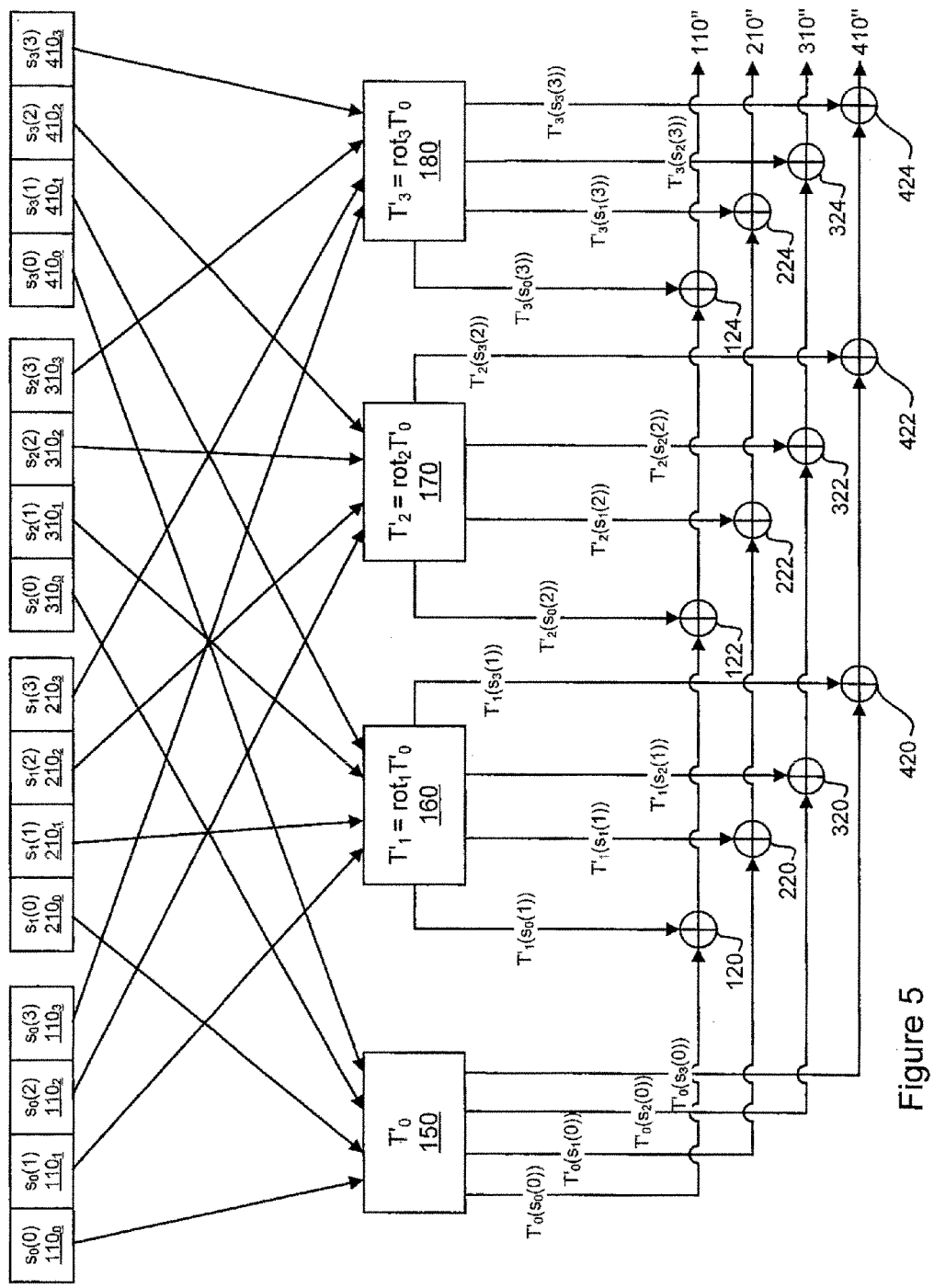
FIG. 5 is a schematic representation of a portion of a cryptographic round using four masked substitution tables in accordance with the exemplary embodiment.

Each of these masked substitution tables $T'_0$, $T'_1$, $T'_2$, $T'_3$ is shown in FIG. 5 as 150, 160, 170, and 180 respectively. The cryptographic round proceeds in a manner similar to that described with respect to FIG. 4b, with the exception that the separate rotation operations 112, 114, 116 of FIG. 4b are not carried out, since the rotations of both the mask and the substitution tables were performed prior to the masking of the substitution tables. It will be appreciated by those skilled in the art that when the substitution table outputs, 110", 210", 310", and 410", are computed, the masks applied to the masked substitution tables 150, 160, 170, and 180 self-cancel as described above.

Figure 7:
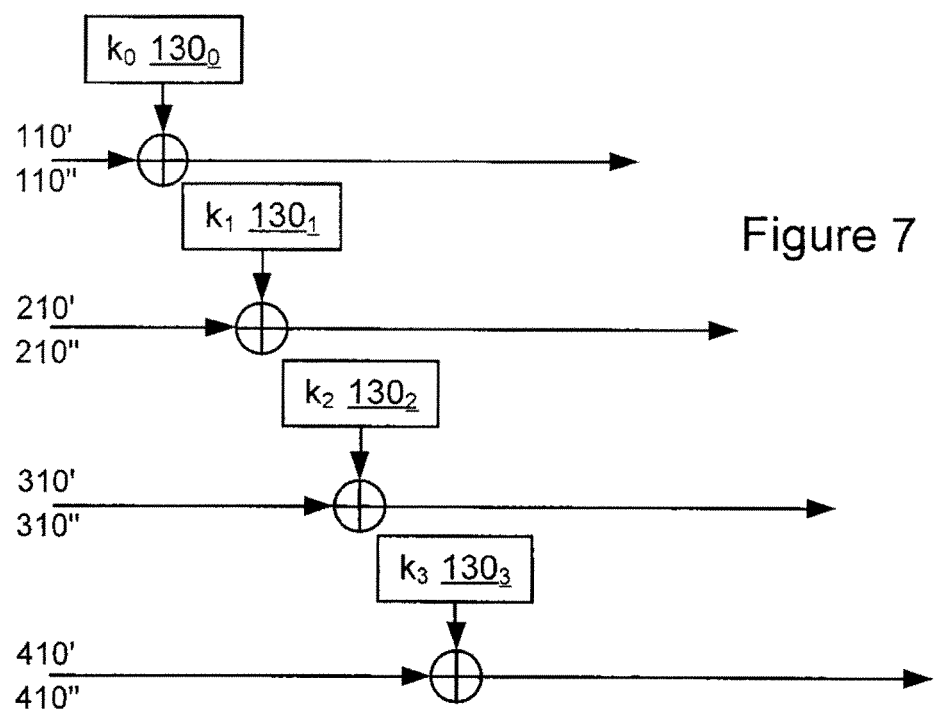
FIG. 7 is a schematic representation of a further portion of a cryptographic round following the portions of FIGS. 4b and 5.

In the AES implementation, the substitution table outputs 110', 210', 310', and 410' or, respectively, outputs 110", 210", 310", and 410" are then XORed to a round key. This process is illustrated in FIG. 7, where each output is combined in a bitwise logical inequality operation with a key value $130_0$, $130_1$, $130_2$, or $130_3$.

As noted above, the mask 100 may be generated and applied at any time. Provided the mask 100 is a self-cancelling mask such that $m_0 \oplus m_1 \oplus m_2 \oplus m_3 = 0$, it will be understood that each newly generated self-cancelling mask 100 may be applied to the stored, masked substitution table 150 without re-computing the original, unmasked substitution table $T_0$, since the self-cancelling property will be preserved when one self-cancelling mask is combined in a bitwise logical inequality operation (such as XOR) with a substitution table entry that was previously masked with a self-cancelling mask value. Similarly, in the four-table embodiment of FIG. 5, the newly generated self-cancelling mask 100 may be applied to the table rotations as described above, provided that the mask 100 is rotated as necessary.

The foregoing masking countermeasures may be applied in both encryption and decryption rounds in AES. It will also be appreciated by those skilled in the art that the foregoing embodiment may also be applied in other cipher implementations utilizing a plurality of substitution tables, including variants and precursors of the Rijndael Block Cipher, where the output from those tables is then combined (for example, through a XOR operation), and where it is desirable that the table output be masked. The selection of the mask size, and number of rotations, will depend on the processes employed in the cipher, and such selection is a variation of the foregoing embodiments that will be understood by those skilled in the art. For example, if the cryptographic process employed requires the XORing of 8 substitution table entries, then the mask 100 may be $m_0m_1m_2m_3m_4m_5m_6m_7$, where $m_0 \oplus m_1 \oplus m_2 \oplus m_3 \oplus m_4 \oplus m_5 \oplus m_6 \oplus m_7 = 0$.

Figure 6:
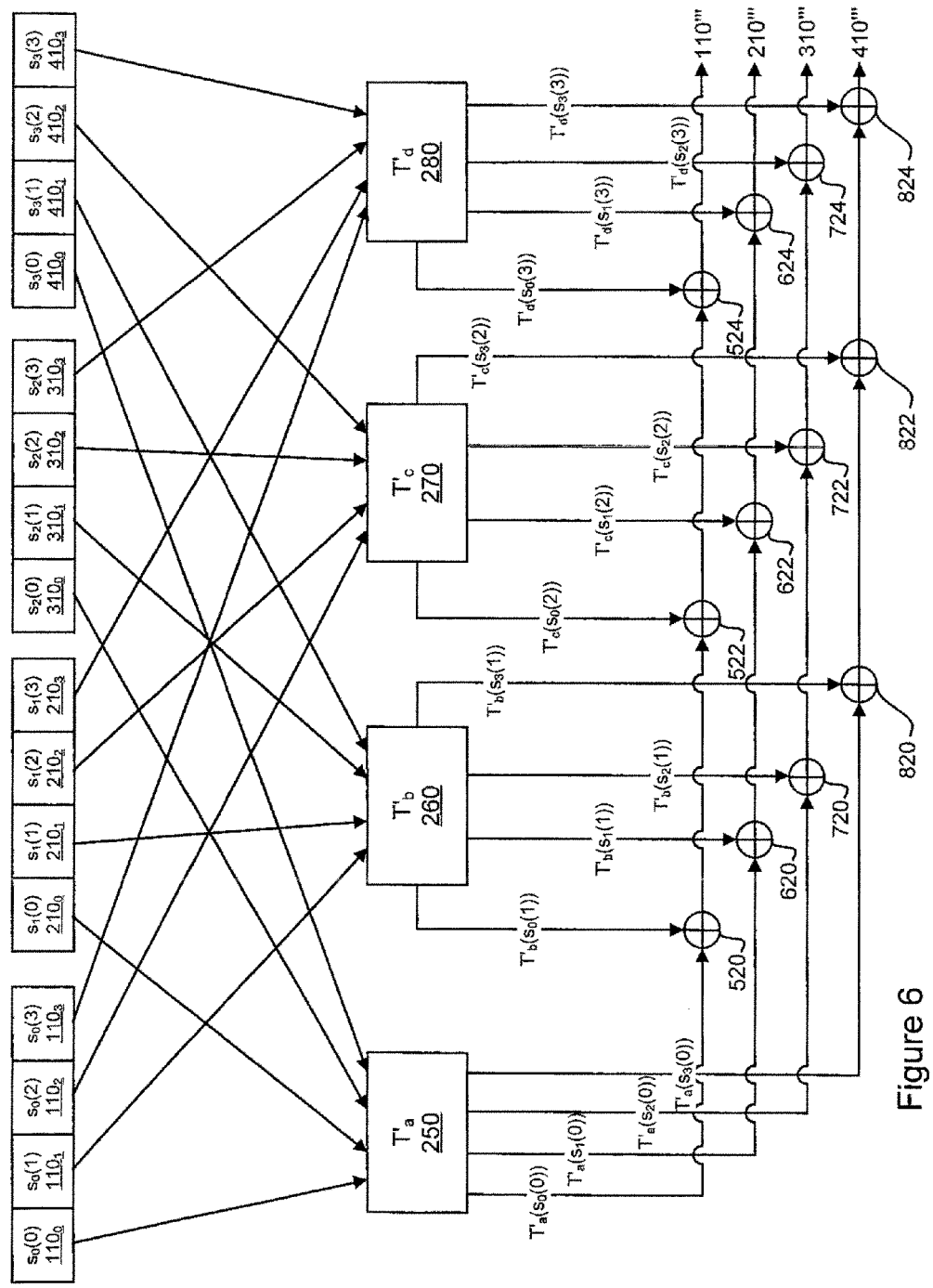
FIG. 6 is a schematic representation of a portion of a cryptographic round using a further set of four masked substitution tables.

A further n-table embodiment is depicted in FIG. 6, which for ease of illustration shows four tables. Rather than defining a single mask 100 represented as $m_0m_1m_2m_3$ with the property that $m_0 \oplus m_1 \oplus m_2 \oplus m_3 = 0$, four separate masks, $M_a$, $M_b$, $M_c$, and $M_d$ are defined instead such that $M_a \oplus M_b \oplus M_c \oplus M_d = 0$, each mask $M_a$, $M_b$, $M_c$, and $M_d$ also having a similar length definition as the mask 100—that is, each mask $M_a$, $M_b$, $M_c$, and $M_d$ having the same length as an entry in the substitution table to which it is applied. The four stored substitution tables used in the cipher, $T_a$, $T_b$, $T_c$, and $T_d$, are each masked by a distinct one of $M_a$, $M_b$, $M_c$, and $M_d$ to provide masked substitution tables $T'_a$, $T'_b$, $T'_c$, and $T'_d$ (250, 260, 270, 280 in FIG. 6 respectively). Thus, for a given input component such as $s_1$ (consisting of bytes $s_1(0)$, $s_1(1)$, $s_1(2)$, and $s_1(3)$), the first input byte $210_0$ is used to obtain a masked substitution table entry, $T'_a(s_1(0))$, from masked substitution table 250; the second input byte $210_1$ is used to obtain a masked substitution table entry, $T'_b(s_1(1))$, from masked substitution table 260; the third input byte $210_2$ is used to obtain a masked substitution table entry, $T'_c(s_1(2))$, from masked substitution table 270; and the fourth input byte $210_3$ is used to obtain a masked substitution table entry, $T'_d(s_1(3))$, from masked substitution table 280. The masked substitution table entries thus obtained are combined in bitwise logical inequality operations, such as XOR operations 620, 622, and 624 to provide substitution table output 210'''.

When the various masked values are obtained from each of the masked substitution tables in this embodiment and then combined in a bitwise inequality operation, the masks $M_a$, $M_b$, $M_c$, and $M_d$ will be cancelled out as follows:

$$T'_a(s_1(0)) \oplus T'_b(s_1(1)) \oplus$$

$$T'_c(s_1(2)) \oplus T'_d(s_1(3)) = (M_a \oplus T_a(s_1(0))) \oplus (M_b \oplus T_b(s_1(1))) \oplus$$

$$(M_c \oplus T_c(s_1(2))) \oplus (M_d \oplus T_d(s_1(3))) =$$

$$M_a \oplus M_b \oplus M_c \oplus M_d \oplus T_a(s_1(0)) \oplus T_b(s_1(1)) \oplus T_c(s_1(2)) \oplus$$

-continued $$T_d(s_1(3)) = 0 \oplus T_a(s_1(0)) \oplus T_b(s_1(1)) \oplus T_c(s_1(2)) \oplus T_d(s_1(3)) =$$

$$T_a(s_1(0)) \oplus T_b(s_1(1)) \oplus T_c(s_1(2)) \oplus T_d(s_1(3))$$

Thus, in generating the output 210''', the masks $M_a$, $M_b$, $M_c$, and $M_d$ are cancelled out. Similarly, the masked substitution table values extracted for the inputs (110$_0$, 110$_1$, 110$_2$, 110$_3$), (310$_0$, 310$_1$, 310$_2$, 310$_3$), and (310$_0$, 310$_1$, 310$_2$, 310$_3$) are combined by the respective bitwise inequality operations (520, 522, 524), (720, 722, 724), and (820, 822, 824) to provide substitution table outputs 210''', 310''', and 410''', respectively. Again, the masks applied to the individual substitution table entries subjected to the inequality operations are cancelled out in the final result of 210''', 310''', and 410'''.

The embodiment of FIG. 6 may equally be applied to any number of substitution tables and corresponding masks, provided the condition of $M_0 \oplus M_1 \oplus \ldots \oplus M_n = 0$, and each of these masks is applied to one of the substitution tables employed in the cryptographic operation or round. It will be appreciated that the inputs applied to the substitution tables are not restricted to bytes or 32-bit words, but may be any suitable size for use in the cryptographic operation or round. Further, the substitution tables $T_0, T_1, \ldots T_n$ may be related to each other, as they are in AES, or subsequent substitution tables may be derived from an initial substitution table through a different relationship; however, the substitution tables need not be related to each other at all, provided that the masks applied to the substitution tables comply with the condition provided above.

Thus, while each output from each substitution table is masked so as to provide a measure of protection against cryptographic attacks, the masking element of the output each of the masked substitution tables is eliminated through the bitwise logical inequality operation when the substitution table output is computed; there is therefore no need to generate or store a separate mask table, as in the prior art. Each random mask is only retained while the substitution table is being masked and then discarded, so the actual accumulated set of masks need never be stored, and thus cannot be intercepted by an attacker.

It will also be appreciated by those skilled in the art that while the bitwise logical inequality operation performed in the AES cipher is a XOR, the embodiments described above may be implemented using the inverse exclusive-or (not-exclusive-or) operation (NXOR); for example, defining the mask 100 such that $m_0$ NXOR $m_1$ NXOR $m_2$ NXOR $m_3 = 0$. In the cryptographic implementation, certain inputs or outputs may be inverted accordingly. The implementation using NXOR is within the scope of the foregoing embodiments.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A computing device-implemented method for executing a round of a substitution table-based cryptographic operation applying n input components of length equal to the length of entries of n substitution tables to produce a round output, the n substitution tables generated in the round by successively applying entry-wise rotations of an initial substitution table, the method comprising, a processor of the computing device:

masking each substitution table entry of the initial substitution table with a first mask via a bitwise logical inequality operation to provide a masked substitution table, wherein the first mask comprises n first mask value components equal length, and wherein a result of a bitwise logical inequality operation combining the n first mask components equals zero, obtaining n interim masked substitution table outputs by, for each $i^{th}$ corresponding one of the n input components, accessing a corresponding entry of the masked substitution table, and rotating the corresponding entry by an $i^{th}$ rotation operation; and, combining the n interim masked substitution table outputs to produce round output.

2. The method of claim 1, wherein the bitwise logical inequality operation is XOR.

3. The method of claim 2, wherein the cryptographic round comprises an AES-defined cryptographic round and a substitution table is provided in accordance with the AES.

4. The method of claim 1, wherein
the first mask is a unique one of n arrangements of the n masked value components, such that in the n arrangements, each of the n masked value components occurs in each of the n positions exactly once.

5. The method of claim 4, wherein the n arrangements comprise a cyclic group of rotations.

6. The method of claim 5, wherein n is four, and the cyclic group of rotations consists of a null rotation, a $rot_1$ rotation, a $rot_2$ rotation, and a $rot_3$ rotation.

7. The method of claim 1, further comprising:
defining a second mask having a length equal to the length of a substitution table entry, the second mask comprising an arrangement of a plurality of n second mask components of equal length, such that a result of the bitwise logical inequality operation on the n second mask components equals zero, and where a bitwise logical inequality operation on the n second masks equals zero; and
masking the masked substitution table with the second mask to provide a further masked substitution table.

8. The method of claim 7, further comprising:
for each of a second set of n input components:
obtaining from the further masked substitution table a further masked value corresponding to the input component of the second set of n input components, and
applying to the further masked value a unique one of a cyclic group of rotations, to obtain a further interim masked substitution table value.

9. A computing device-implemented method for executing a round of a substitution table-based cryptographic operation applying n input components of length equal to the length of entries of n substitution tables to produce a round output, the n substitution tables generated in the round by successively applying entry-wise rotations of an initial substitution table, the method comprising
a processor of the computing device:
storing in a memory of the computing device a set of n masked substitution tables, each ith one of the n masked substitution tables corresponding to an ith one of the n input components, each entry of each one of the n masked substitution tables comprising corresponding entry from one of the n substitution tables masked, via a bitwise logical inequality operation, with a first mask of the same length as the substitution table entries, the first mask comprising n first mask components of equal length, and wherein a result of a bitwise logical inequality operation combining the n first mask components equals zero,
such that each entry of each one of the set of n masked substitution tables is stored as a unique one of n arrangements of the n masked substitution table entry components of a corresponding entry of the substitution table thus masked, such that in the n arrangements each of the n masked substitution table entry components occurs in each of n positions exactly once, and such that an ith one of the n arrangements corresponds to an ith one of the n input components; and
for each ith one of the n input components, obtaining the interim masked substitution table value corresponding to the ith input component from the ith one of the set of n masked substitution tables.

10. The method of claim 9, wherein the n arrangements comprise a cyclic group of rotations.

11. The method of claim 10, wherein n is four, and the cyclic group of rotations consists of a null rotation, a $rot_1$ rotation, a $rot_2$ rotation, and a $rot_3$ rotation.

12. A computing device-implemented method for executing a round of a substitution table-based cryptographic operation applying n input components of length equal to the length of entries of n substitution tables to produce a round output, the method comprising
a processor of the computing device:
for each input component of the n input components, obtaining a masked substitution table value corresponding to that input component from a corresponding entry in a respective one of n masked substitution tables; to generate n interim masked substitution tale outputs, wherein the n masked substitution tables each comprise a unique one of the n substitution tables masked, via a bitwise logical inequality operation, with a unique one of n masks, the n masks being defined as having a unique combination of the n first mask components, such that the result of a bitwise logical inequality operation combining the n masks equals zero; and,
combining the n interim masked substitution table outputs to produce the round output.

13. The method of claim 12, wherein the bitwise logical inequality operation is XOR.

14. The method of claim 13, wherein the cryptographic round comprises an AES-defined cryptographic round.

15. The method of claim 12, further comprising providing the plurality of masks by:
generating all but one of the plurality of masks; and
generating the remaining of the plurality of masks such that the result of the bitwise logical inequality operation on the plurality of masks equals zero.

16. The method of claim 15, wherein generating all but one of the plurality of masks comprises generating all but one of the plurality of masks from one or more pseudo-random values.

17. The method of claim 12, further comprising providing the plurality of masks by:
generating each of n masks as one of n arrangements of the n mask components in n unique positions, such that in the n arrangements, each of the n mask components occurs in each of the n positions exactly once, wherein the n arrangements comprise a cyclic group of rotations.

18. A non-transitory computer readable medium storing computer readable instructions executable by a processor of a computing device for causing said computing device to:
for each input component of a set of input components of equal length in a cryptographic round utilizing a substitution table comprising a set of entries each length equal to the length of each input component, obtain an interim masked substitution table value corresponding to the input component from a masked substitution table, the masked substitution table comprising the substitution table wherein each entry therein is masked via a bitwise logical inequality operation with a first mask of the same length as each substitution table entry,
the first mask comprising a plurality of first mask components of equal length, such that a result of a bitwise logical inequality operation on the first mask components equals zero.

19. The computer readable medium of claim 18, wherein the set of input components comprises a plurality of n input components, the medium further storing computer readable instructions executable by a processor of a computing device for causing said computing device to:
defining the first mask to comprise a plurality of n first mask components of equal length; and
masking each substitution table entry with the first mask to provide the masked substitution table;
and wherein the computer readable instructions, when executed, further cause the processor to obtain the interim masked substitution table value for each input component by:

obtaining from the masked substitution table a masked value corresponding to the input component, the masked value comprising n masked value components, and storing the masked value as a unique one of n arrangements of the n masked value components in n unique positions, such that in the n arrangements, each of the n masked value components occurs in each of the n positions exactly once.

20. A non-transitory computer readable medium storing computer readable instructions executable by a processor of a computing device for causing said computing device to:

store a set of n masked substitution tables, each ith one of the n masked substitution tables corresponding to an ith one of n input components of equal length, each entry of each one of the n masked substitution tables comprising a plurality of n masked substitution table entry components of equal length, each of said n masked substitution table entry components comprising a corresponding entry from a substitution table comprising a set of entries each of length equal to the length of each of the n input components, the substitution table being masked, via a bitwise logical inequality operation, with a first mask of the same length as each substitution table entry, the first mask comprising a plurality of first mask components of equal length such that a result of a bitwise logical inequality operation on the first mask components equals zero, such that each entry of each one of the set of n masked substitution tables is stored as a unique one of n arrangements of the n masked substitution table entry components of a corresponding entry of the substitution table thus masked, such that in the n arrangements each of the n masked substitution table entry components occurs in each of n positions exactly once, and such that an ith one of the n arrangements corresponds to an ith one of the n input components; and for each ith one of the n input components, obtaining an interim masked substitution table value corresponding to the ith input component from the ith one of the set of n masked substitution tables.

21. A non-transitory computer readable medium storing computer readable instructions executable by a processor of a computing device to implement a method for executing a round of a substitution table-based cryptographic operation applying n input components of length equal to the length of entries of n substitution tables to produce a round output, said instruction executable to cause said computing device to:

for each input component of a set of n input components, obtain a masked substitution table value corresponding to the input component from a corresponding entry in a respective one of n masked substitution tables, to generate n interim masked substitution table outputs, wherein the n masked substitution tables each comprise a unique one of the n substitution tables masked, via a bitwise logical inequality operation, with a unique one of n masks, the n masks based on n first mask components of equal length, each of the n masks being defined as having a unique combination of the n first mask components, such that the result of a bitwise logical inequality operation on the n masks equals zeros; and, combine the n interim masked substitution table outputs to produce the round output.

22. A computing device comprising:

a memory for storing a masked substitution table;

a processor configured, for each input component of a set of input components of equal length in a cryptographic round utilizing a substitution table comprising a set of entries each length equal to the length of each input component, to obtain an interim masked substitution table value corresponding to the input component from the masked substitution table, the masked substitution table comprising the substitution table wherein each entry therein is masked via a bitwise logical inequality operation with a first mask of the same length as each substitution table entry, the first mask comprising a plurality of first mask components of equal length, such that a result of a bitwise logical inequality operation on the first mask components equals zero.

23. A computing device comprising:

a memory for storing a set of n masked substitution tables, each ith one of the n masked substitution tables corresponding to an ith one of n input components of equal length, each entry of each one of the n masked substitution tables comprising a plurality of n masked substitution table entry components of equal length, each of said n masked substitution table entry components comprising a corresponding entry from a substitution table comprising a set of entries each of length equal to the length of each of the n input components, the substitution table being masked, via a bitwise logical inequality operation, with a first mask of the same length as each substitution table entry, the first mask comprising a plurality of first mask components of equal length such that a result of a bitwise logical inequality operation on the first mask components equals zero, such that each entry of each one of the set of n masked substitution tables is stored as a unique one of n arrangements of the n masked substitution table entry components of a corresponding entry of the substitution table thus masked, such that in the n arrangements each of the n masked substitution table entry components occurs in each of n positions exactly once, and such that an ith one of the n arrangements corresponds to an ith one of the n input components; and a processor configured, for each ith one of the n input components, to obtain an interim masked substitution table value corresponding to the ith input component from the ith one of the set of n masked substitution tables.

24. A computing device comprising:

a memory for storing n masked substitution tables;

a processor configured, for each input component of a set of n input components, to obtain a masked substitution table value corresponding to that input component from a respective one of n masked substitution tables to generate n interim masked substitution table outputs, wherein, the n masked substitution tables each comprise a unique one of n substitution tables masked, via a bitwise logical inequality operation, with a unique one of n masks being defined as having a unique combination of the n first mask components, such that the result of a bitwise logical inequality operation combining the n masks equals zero; and to combine the interim masked substitution table outputs to produce the round output.

* * * * *